United States Patent

Sekita

[11] Patent Number: 5,761,553
[45] Date of Patent: Jun. 2, 1998

[54] PHOTOGRAPHING DEVICE INCLUDING VIEWFINDER OPTICAL SYSTEM HAVING LENS WITH ASYMMETRICAL DIMENSIONS

[75] Inventor: Makoto Sekita, Kanagawa-ken, Japan

[73] Assignee: Canon Kabushiki Kaisha, Tokyo, Japan

[21] Appl. No.: 567,237

[22] Filed: Dec. 5, 1995

[30] Foreign Application Priority Data

Dec. 22, 1994 [JP] Japan ................... 6-336061

[51] Int. Cl.$^6$ ............ G03B 17/20; G03B 13/02; G03B 13/14
[52] U.S. Cl. ............ 396/296; 396/373; 396/377
[58] Field of Search ............ 354/219, 155, 354/159; 396/373, 377, 296; 359/557, 720

[56] References Cited

U.S. PATENT DOCUMENTS

| | | | |
|---|---|---|---|
| 2,906,160 | 9/1959 | Palley | 356/253 |
| 2,968,209 | 1/1961 | Aulin | 350/436 |
| 3,305,294 | 2/1967 | Alvarez | 351/169 |
| 3,388,343 | 6/1968 | White | 350/436 |
| 3,583,790 | 6/1971 | Baker | 350/184 |
| 3,836,931 | 9/1974 | Plummer | 354/155 |
| 3,860,940 | 1/1975 | Baker | 354/155 |
| 4,171,888 | 10/1979 | Shono et al. | 354/155 |
| 4,339,178 | 7/1982 | Smith | 350/432 |
| 4,812,864 | 3/1989 | Baker et al. | 354/224 |
| 4,910,545 | 3/1990 | Fujibayashi et al. | 354/225 |
| 4,912,500 | 3/1990 | Yokota et al. | 354/479 |
| 4,949,978 | 8/1990 | Berner | 273/288 |
| 4,969,723 | 11/1990 | Kato et al. | 350/501 |
| 5,166,718 | 11/1992 | Suzuki et al. | 354/402 |
| 5,173,723 | 12/1992 | Volk | 351/161 |
| 5,319,405 | 6/1994 | Ikemori | 354/155 |
| 5,420,657 | 5/1995 | Kosako | 354/219 |
| 5,610,678 | 3/1997 | Tsuboi et al. | 396/373 |

FOREIGN PATENT DOCUMENTS

| | | |
|---|---|---|
| 57-155511 | 9/1982 | Japan. |
| 3-92630 | 9/1991 | Japan. |

OTHER PUBLICATIONS

Dictionary of Scientific and Technical Terms, p. 1043, (Definition of Optical Axis) McGraw Hill, 1974.

*Primary Examiner*—Safet Metjahic
*Assistant Examiner*—Christopher E. Mahoney
*Attorney, Agent, or Firm*—Fitzpatrick, Cella, Harper & Scinto

[57] ABSTRACT

A photographing device includes a photographing optical system and a viewfinder optical system provided independently of the photographing optical system, and at least one lens which constitutes the viewfinder optical system and has respective lengths extending in opposite directions from an optical axis of the lens to a periphery thereof, the respective lengths being different from each other in a horizontal direction and/or vertical direction. In the photographing device, the lens which constitutes the viewfinder optical system may be arranged in such a manner that a length extending toward the photographing optical system from an optical axis of the viewfinder optical system to the periphery of the lens is longer than a length extending in a direction opposite to the photographing optical system from the optical axis to the periphery. Such a photographing device enables observation (confirmation) of an entire object to be photographed, even during close-distance photography.

21 Claims, 2 Drawing Sheets

PHOTOGRAPHING DEVICE INCLUDING VIEWFINDER OPTICAL SYSTEM HAVING LENS WITH ASYMMETRICAL DIMENSIONS

BACKGROUND OF THE INVENTION

1. Field of the Invention

The present invention relates to a photographing device which is provided with a viewfinder optical system independently of a photographing optical system.

2. Description of the Related Art

There have heretofore been some types of cameras, such as lens shutter cameras, still video cameras and video cameras, which adopt a photographing device including an external viewfinder optical system having an optical axis different from the optical axis of a photographing optical system.

The photographing device including the external viewfinder optical system has the advantage that the photographing device can be made far more compact because there is no need for an optical member for taking out part of photographing light flux midway through the optical path of the photographing optical system, as compared with, for example, a photographing apparatus of the TTL (Through The Lens) viewfinder type in which part of photographing light flux needs to be taken out midway through the optical path of the photographing optical system.

However, a photographing device including an external viewfinder optical system has the problem that, since a optical axis of an photographing optical system is spaced a predetermined distance apart from the optical axis of the viewfinder optical system, a so-called parallax occurs, i.e., a photographing area provided by the photographing optical system differs from an observing area provided by the viewfinder optical system, depending on photographing distance.

In general, as the photographing distance becomes shorter, the amount of deviation of the parallax becomes larger, and the direction of deviation of the parallax coincides with a direction toward the optical axis of the photographing optical system.

In the case of photographing devices having an ordinary external viewfinder optical system, a general solution to this problem is to warn a photographer by displaying within the field of view of the viewfinder optical system a close-distance correction mark indicative of a photographing area corresponding to the amount and direction of deviation of the parallax at the closest distance of the photographing optical system.

In such a conventional photographing device having an external viewfinder optical system, the ratio of the photographing area provided by the photographing optical system to the observing area provided by the viewfinder optical system, i.e., a field-of-view ratio, differs between normal photography and close-distance photography.

This is because the shape of each lens of the viewfinder optical system is determined on the basis of only an effective light flux usable for normal photography in order to design a far more compact viewfinder optical system. Specifically, if the shape of each lens of the viewfinder optical system is determined in such a way, an effective light flux usable for close-distance photography will be vignetted because of an increase in the amount of deviation of the parallax during the close-distance photography, with the result that the field-of-view ratio will become larger in normal photography than in close-distance photography.

This leads to the problem that, particularly during close-distance photography, a photographing area which a photographer desires to photograph is partly lost so that the desired photographing area is not completely photographed.

SUMMARY OF THE INVENTION

It is, therefore, an object of the present invention to provide a photographing device which enables observation (confirmation) of an entire object to be photographed, even during close-distance photography.

To achieve the above-described object, according to a first aspect of the present invention, a photographing device comprises a photographing optical system, and a viewfinder optical system provided independently of the photographing optical system, wherein at least one lens which constitutes the viewfinder optical system has lengths extending in opposite directions from an optical axis of the at least one lens to a periphery thereof, the lengths being different from each other in horizontal direction and/or vertical direction.

According to a second aspect of the present invention, there is provided a photographing device which comprises a photographing optical system, and a viewfinder optical system provided independently of the photographing optical system, wherein at least one lens which constitutes the viewfinder optical system is arranged in such a manner that a length extending toward the photographing optical system from an optical axis of the viewfinder optical system to a periphery of the at least one lens is longer than a length extending in a direction opposite to the photographing optical system from the optical axis to the periphery.

In each of the photographing devices according to the first and second aspects of the present invention, the viewfinder optical system includes a plurality of lenses and the at least one lens is preferably located nearest to an object side of all the plurality of lenses.

In the photographing device according to the first aspect of the present invention, the following conditions are preferably satisfied:

0.5<LR<0.8, and/or 0.5<UD<0.8, where LR represents a value obtained by dividing a shorter length extending in one horizontal direction from the optical axis of the at least one lens to the periphery thereof by a longer length extending in an opposite horizontal direction from the optical axis of the at least one lens to the periphery thereof, and UD represents a value obtained by dividing a shorter length extending in one vertical direction from the optical axis of the at least one lens to the periphery thereof by a longer length extending in an opposite vertical direction from the optical axis of the at least one lens to the periphery thereof.

In the photographing device according to the second aspect of the present invention, the following condition is preferably satisfied:

0.5<SL<0.8, where SL represents a value obtained by dividing a length extending in a direction opposite to the photographing optical system from the optical axis of the viewfinder optical system to the periphery of the at least one lens by a length extending toward the photographing optical system from the optical axis of the viewfinder optical system to the periphery of the at least one lens.

In each of the photographing devices according to the first and second aspects of the present invention, it is preferable that two or more field-of-view frames having the same field-of-view ratio which indicate different photographing areas relative to different photographing distances are displayed in a field of view of a viewfinder. Further, it is preferable that character information is displayed close to a periphery of each of the field-of-view frames.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

Figure 1:
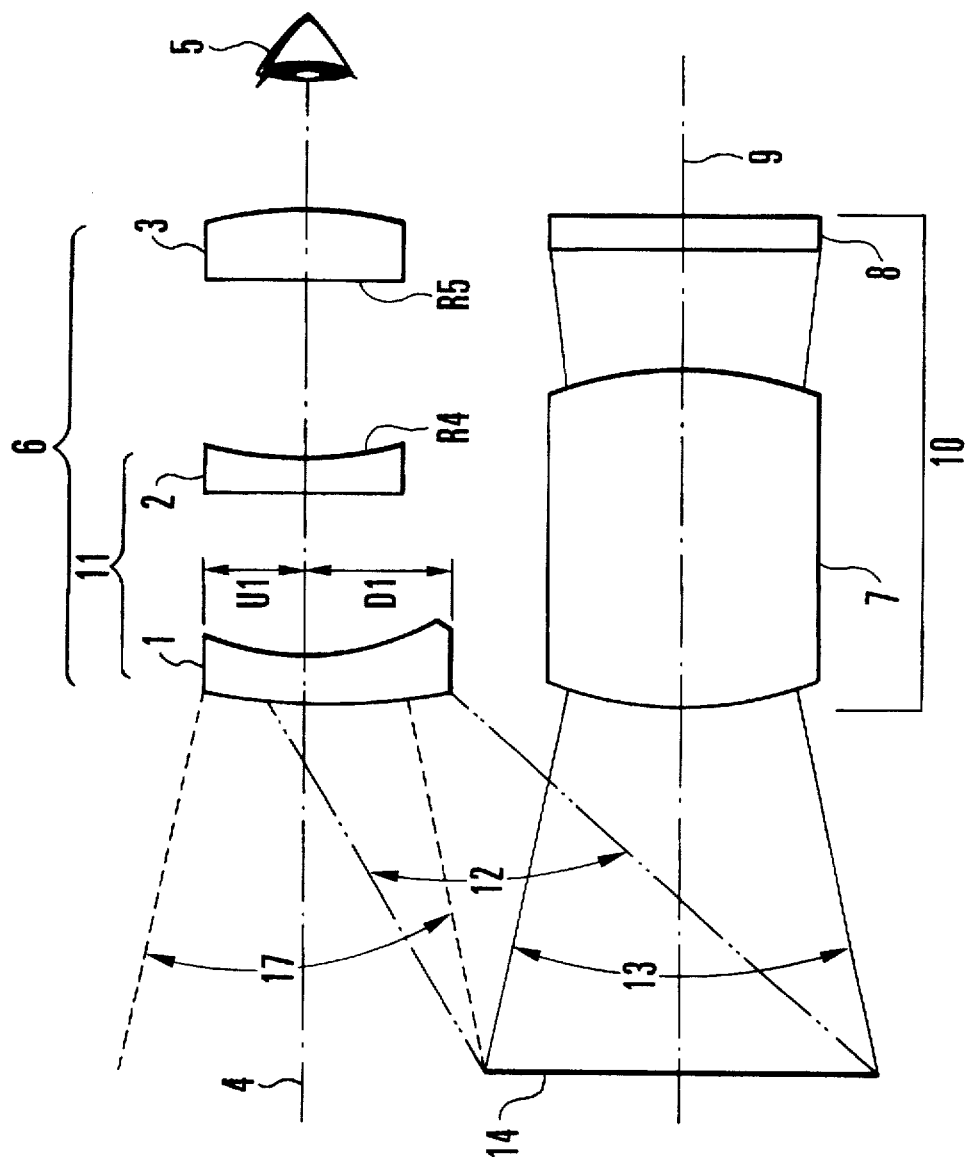
FIG. 1 is a schematic view of the essential portion of a photographing device according to an embodiment of the present invention.
Figure 2:
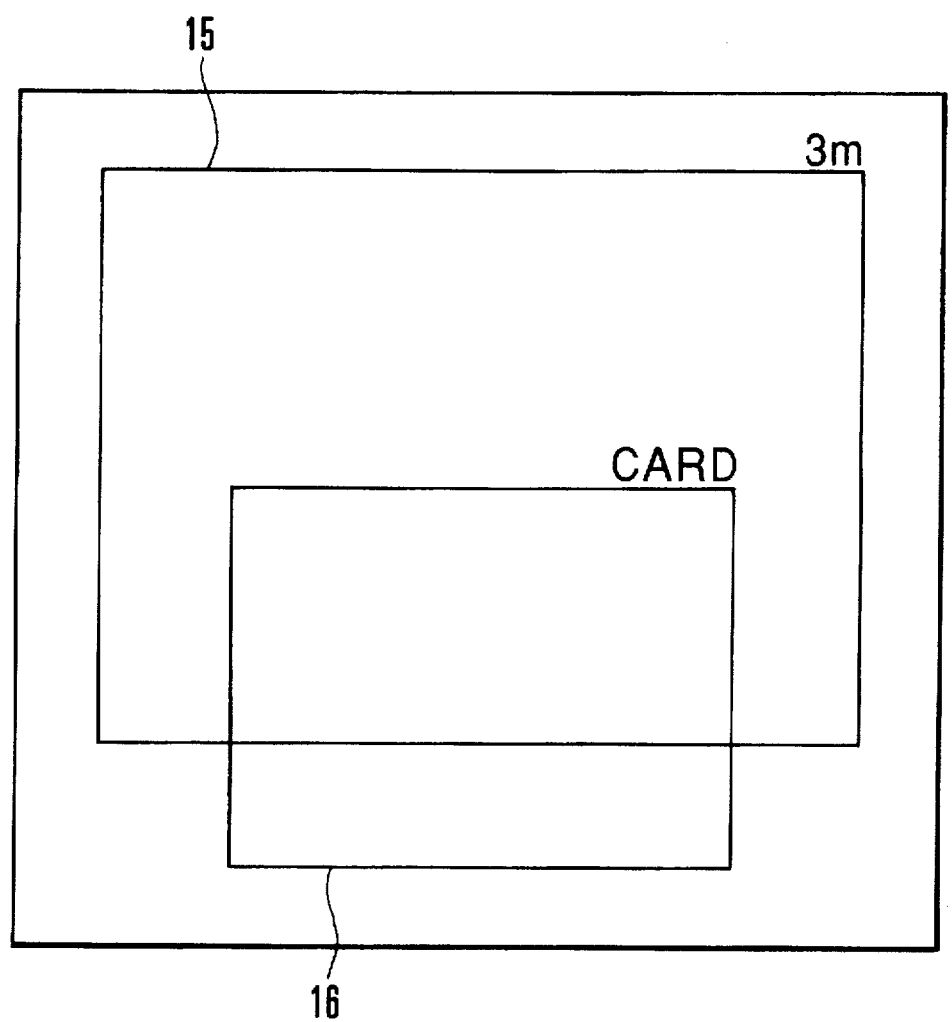
FIG. 2 is an explanatory view aiding in explaining the shape of each field-of-view frame of the photographing device according to the embodiment of the present invention.

FIG. 1 is a schematic view of the essential portion of a photographing device according to an embodiment of the present invention. FIG. 2 is an explanatory view aiding in explaining the shape of each viewfinder field-of-view frame of the photographing device according to the embodiment of the present invention.

Referring to FIG. 1, a viewfinder optical system 6 is an Albada viewfinder composed of an objective lens group 11 and an eyepiece lens 3. The objective lens group 11 is composed of a negative objective lens 1 having a concave surface on the side of a pupil 5 of a photographer (observer) and a negative semi-transmission lens 2 having a concave surface on the side of the pupil 5 of the photographer.

In the present embodiment, the objective lens 1 is constructed so that a length D1 extending toward a photographing optical system 10 from a viewfinder optical axis 4 of the viewfinder optical system 6 to the periphery of the objective lens 1 is made longer than a length U1 extending in a direction opposite to the photographing optical system 10 from the viewfinder optical axis 4 of the viewfinder optical system 6 to the periphery of the objective lens 1. This construction makes it possible to observe the entire object to be photographed, over the entire range of photographing distances. The semi-transmission lens 2 has a lens surface (concave surface) R4 which serves as a semi-transmission and semi-reflection surface on the side of the pupil 5 of the photographer. A reflection surface is formed on part of a lens surface R5 of the eyepiece lens 3 on the object side thereof by vapor deposition, and this reflection surface constitutes field-of-view frames 15 and 16 as schematically shown in FIG. 2.

The photographing optical system 10 is composed of a photographing lens 7 and an image pickup element 8. The image pickup element 8 is made from, for example, a solid-state image pickup element (CCD). The photographing optical system 10 has a photographing optical axis 9.

For the sake of simplicity of explanation, the present embodiment is constructed in such a manner that, as shown in FIG. 1, the viewfinder optical axis 4 is displaced in an upward direction perpendicular to the photographing optical axis 9, and the viewfinder optical axis 4 and the photographing optical axis 9 are not horizontally displaced from each other.

In the photographing device including an external viewfinder optical system in which the viewfinder optical system 6 and the photographing optical system 10 respectively have the different optical axes 4 and 9, an object lying at a normal photographing distance is observed through an observing light flux 17 which is shown by dotted lines in FIG. 1.

In the case of the aforesaid conventional photographing device having the external viewfinder optical system in which the external diameter of each of the lenses 1, 2 and 3 of the viewfinder optical system 6 is determined on the basis of the observing light flux 17 arriving from normal photographing distances, it is impossible for the photographer to observe (confirm) a close-distance object 14 to be photographed through a photographing light flux 13, because the close-distance object 14 lies on the photographing optical axis 9 with respect to the observing light flux 17.

For this reason, in the present embodiment, in order that an observing light flux 12 shown by chain double-dashed lines in FIG. 1 may allow the photographer to observe, without vignetting, the close-distance object 14 lying on the photographing optical axis 9 with respect to the observing light flux 17, the length D1 extending from the viewfinder optical axis 4 toward the photographing optical axis 9 is made longer than the length U1 extending from the viewfinder optical axis 4 in a direction away from the photographing optical axis 9. With this arrangement, the photographer can observe the close-distance object 14 through the observing light flux 12 without vignetting.

In addition, in the present embodiment, in order that the photographer may readily confirm without parallax an object to be photographed, merely by looking into a viewfinder, the two field-of-view frames 15 and 16 of the same field-of-view ratio which indicate different photographing areas relative to different photographing distances as shown in FIG. 2 are displayed in the field of view of the viewfinder. In addition, character strings indicative of specific states of photography are displayed close to the peripheries of the two field-of-view frames 15 and 16, respectively.

Specifically, the field-of-view frame 15 shown in FIG. 2 indicates that an object lying at a normal photographing distance, such as 3 meters, can be observed without parallax, and character information, for example "3 m", indicating that the field-of-view frame 15 is intended for a photographing distance of 3 meters is displayed in the vicinity of the field-of-view frame 15.

The field-of-view frame 16 shown in FIG. 2 is intended for close-distance photography. For example, if the photographing device is incorporated in a camera of the type suitable for use in photographing a card, such as a cash card or a credit card, the field-of-view frame 16 is provided at a location which enables such card to be photographed without parallax, and character information, for example "CARD", indicating that the field-of-view frame 16 is intended for card photography is displayed in the vicinity of the field-of-view frame 16.

As is apparent from the above description, according to the present invention, the photographer can readily confirm without parallax an object to be photographed, merely by looking into the viewfinder. In other words, the photographer can accurately determine a correct photographing area over the entire range of photographing distances. Incidentally, the field-of-view frame 15 and the field-of-view frame 16 have different sizes because a variation in photographing distance involves a variation in image magnification.

According to the present embodiment, the shape of the objective lens 1 is set by prescribing the ratio of the length D1 extending from the viewfinder optical axis 4 toward the photographing optical axis 9 to the length U1 extending from the viewfinder optical axis 4 in the direction away from the photographing optical axis 9. Specifically, the shape of the objective lens 1 is set to satisfy the following condition:

$$0.5<UD<0.8 \tag{1}$$

where UD represents the value obtained by dividing a shorter vertical length extending in one direction from the viewfinder optical axis 4 to the periphery of the objective lens 1 by a longer vertical length extending in the opposite direction from the viewfinder optical axis 4 to the periphery of the objective lens 1. In the present embodiment, UD=U1/D1.

The condition (1) is intended to prescribe the shape of the objective lens 1. If the value of UD is lower than the lower limit of condition (1), it will become difficult to satisfy the optical performance of the viewfinder optical system relative to close-distance photography, and the entire size of the viewfinder optical system will increase. If the value of UD is greater than the upper limit of condition (1), the shortest distance at which an image in the viewfinder optical system can be observed without vignetting will become excessively long.

By way of example, the present embodiment has been described above with reference to the arrangement in which, as viewed in FIG. 1, the viewfinder optical axis 4 is displaced in the upward direction perpendicular to the photographing optical axis 9 with the viewfinder optical axis 4 and the photographing optical axis 9 being not displaced from each other in the horizontal direction. However, as a matter of course, the viewfinder optical axis 4 and the photographing optical axis 9 may also be displaced from each other in the horizontal direction.

Specifically, the shape of the objective lens 1 is set to satisfy the following condition:

$$0.5<LR<0.8 \tag{2}$$

where LR represents the value obtained by dividing a shorter horizontal length extending in one direction from the viewfinder optical axis 4 to the periphery of the objective lens 1 by a longer horizontal length extending in the opposite direction from the viewfinder optical axis 4 to the periphery of the objective lens 1.

Condition (2) is intended to prescribe the shape of the objective lens 1. The upper and lower limits of condition (2) are prescribed for reasons similar to those described in connection with condition (1).

The present embodiment has been described with reference to two arrangements, in one of which the viewfinder optical axis 4 is displaced from the photographing optical axis 9 in the vertical direction and in the other of which the viewfinder optical axis 4 is displaced from the photographing optical axis 9 in the horizontal direction. However, as a matter of course, the viewfinder optical axis 4 and the photographing optical axis 9 may also be displaced from each other in an oblique direction. In this arrangement as well, according to the present embodiment, horizontal and vertical displacement components may be separately considered. Therefore, the present embodiment is not limited to only the aforesaid vertical and horizontal displacements.

Specifically, at least one lens selected from among a plurality of lenses which constitute the viewfinder optical system 6 may be set so that the length of the at least one lens extending toward the photographing optical system 10 from the viewfinder optical axis 4 of the viewfinder optical system 6 to the periphery of the at least one lens is made longer than the length of the at least one lens extending in a direction opposite to the photographing optical system 10 from the viewfinder optical axis 4 of the viewfinder optical system 6 to the periphery of the at least one lens. In the present embodiment, the shape of the lens nearest to the object side of all the lenses that constitute the viewfinder optical system 6, i.e., the shape of the objective lens 1, is set to satisfy the following condition:

$$0.5<SL<0.8 \tag{3}$$

where SL represents the value obtained by dividing the length extending in the direction opposite to the photographing optical system 10 from the viewfinder optical axis 4 of the viewfinder optical system 6 to the periphery of the objective lens 1 by the length extending toward the photographing optical system 10 from the viewfinder optical axis 4 of the viewfinder optical system 6 to the periphery of the objective lens 1.

The condition (3) is intended to prescribe the shape of the objective lens 1. The upper and lower limits of condition (3) are prescribed for reasons similar to those described in connection with conditions (1) and (2).

As is apparent from above description, according to the present embodiment, the shape of at least one lens selected from a plurality of lenses which constitute a viewfinder optical system is appropriately set as described above, and two or more field-of-view frames of the same field-of-view ratio which indicate different photographing areas relative to different photographing distances are displayed in the field of view of the viewfinder, and character information indicative of specific states of photography are displayed close to the peripheries of the field-of-view frames, respectively. Accordingly, the photographer can observe an entire object to be photographed, over the entire range of photographing distances (particularly, even during close-distance photography), so that the photographer can photograph the object without any deviation from his/her intended area of the object.

Although the present embodiment has been described above with reference to the Albada viewfinder optical system by way of example, the kind of viewfinder optical system is not limited to only the Albada viewfinder optical system. For example, the present invention can be applied to an external viewfinder optical system such as a first-order image-forming type of viewfinder or a second-order image-forming type of viewfinder, in a manner similar to that used in the above-described embodiment.

Numerical examples 1 and 2 of the present invention will be described below. In each of the numeral examples 1 and 2, ri represents the radius of curvature of the i-th lens surface as viewed from an object side, di represents the i-th lens thickness or air separation as viewed from the object side, ni represents the refractive index of the i-th lens relative to the d line, and vi represents the Abbe number of the i-th lens. E-i represents $10^{-i}$.

The observation-side surface of the objective lens 1 (the second lens surface) and the observation-side surface of the eyepiece lens 3 (the sixth lens surface) are of aspherical shape. If the X axis represents the direction of the optical axis; the Y axis represents the direction perpendicular to the optical axis; and R represents the vertex radius of curvature, the shape of each of the aspherical surfaces are expressed as follows:

$$X = \frac{Y^2/R}{1+\sqrt{1-(Y/R)^2}} + A*Y^2 + \sum_i (Bi*Y^{2(i+1)})$$

where A and Bi represent aspherical coefficients.

The numerical examples of the respective first and second lens surfaces are shown below, with RIi representing the position relative to the viewfinder optical axis 4 of a light ray which passes through the portion of the viewfinder optical system nearest to the photographing optical system 10 and ROi representing the position opposite to the aforesaid position.

| Numerical Example 1 | | | |
|---|---|---|---|
| r1 = 106.250 | d1 = 3.00 | n1 = 1.49171 | v1 = 57.4 |
| *r2 = 12.785 | *d2 = 19.21 | | |
| r3= 758.849 | d3 = 3.00 | n2 = 1.49171 | v2 = 57.4 |
| r4 = 38.262 | d4 = 11.85 | | |
| r5 = ∞ | d5 = 3.00 | n3 = 1.49171 | v3 = 57.4 |
| *r6 = −23.202 | d6 = 16.00 | | |

Aspherical Coefficients of Second Surface
A= 0
B1= −2.82959E−5
B2= −2.37517E−7
Aspherical Coefficients of Sixth Surface
A= 0
B1= 3.62746E−6
RI1= 9.23 RO1= 6.40 Ratio:0.69
RI2= 7.82 RO2= 5.65 Ratio:0.72

| Numerical Example 2 | | | |
|---|---|---|---|
| r1 = 51.280 | d1 = 3.20 | n1 = 1.49171 | v1 = 57.4 |
| *r2 = 10.888 | d2 = 15.01 | | |
| r3 = −661.408 | d3 = 2.80 | n2 = 1.49171 | v2 = 57.4 |
| r4 = 63.118 | d4 = 16.00 | | |
| r5 = ∞ | d5 = 3.00 | n3 = 1.49171 | v3 = 57.4 |
| *r6 = −26.147 | d6 = 16.00 | | |

Aspherical Coefficients of Second Surface
A= 0
B1= −4.10927E−5
B2= −2.90552E−7
B3= −2.78446E−9
Aspherical Coefficients of Sixth Surface
A= 0
B1= 2.12996E−7
RI1= 9.10 RO1= 6.34 Ratio:0.70
RI2= 7.54 RO2= 5.50 Ratio:0.73

As is apparent from the foregoing description, in a photographing device including an external viewfinder optical system according to the present invention, it is possible to observe the entire object to be photographed, even during close–distance photography.

What is claimed is:

1. A photographing device comprising:
   a photographing optical system; and
   a viewfinder optical system provided independently of said photographing optical system;
   wherein at least one lens which constitutes said viewfinder optical system has respective lengths extending in opposite directions from an optical axis of said at least one lens to a periphery thereof, said respective lengths being different from each other in a vertical direction.

2. A photographing device according to claim 1, wherein said viewfinder optical system includes a plurality of lenses, said at least one lens being located nearest to an object side of all the plurality of lenses.

3. A photographing device according to claim 1, wherein 0.5<UD<0.8,
   where UD represents a value obtained by dividing a shorter length extending in one vertical direction from the optical axis of said at least one lens to the periphery thereof by a longer length extending in an opposite vertical direction from the optical axis of said at least one lens to the periphery thereof.

4. A photographing device according to claim 1, wherein two or more field-of-view frames having the same field-of-view ratio which indicate different photographing areas relative to different photographing distances are displayed in a field of view of a viewfinder.

5. A photographing device according to claim 4, wherein character information is displayed close to a periphery of each of said field-of-view frames.

6. A photographing device comprising:
   a photographing optical system; and
   a viewfinder optical system provided independently of said photographing optical system;
   wherein at least one lens which constitutes said viewfinder optical system is arranged in such a manner that a length extending toward said photographing optical system from an optical axis of said at least one lens to a periphery of said at least one lens is longer than a length extending in a direction opposite said photographing optical system from the optical axis of said viewfinder optical system to the periphery of said at least one lens.

7. A photographing device according to claim 6, wherein said viewfinder optical system includes a plurality of lenses, said at least one lens being located nearest to an object side of all the plurality of lenses.

8. A photographing device according to claim 6, wherein 0.5<SL<0.8, where SL represents a value obtained by dividing a length extending in a direction opposite to said photographing optical system from an optical axis of said viewfinder optical system to the periphery of said at least one lens by a length extending toward said photographing optical system from the optical axis of said viewfinder optical system to the periphery of said at least one lens.

9. A photographing device according to claim 6, wherein two or more field-of-view frames having the same field-of-view ratio which indicate different photographing areas relative to different photographing distances are displayed in a field of view of a viewfinder.

10. A photographing device according to claim 9, wherein character information is displayed close to a periphery of each of said field-of-view frames.

11. A photographing device comprising:
    a photographing optical system; and
    a viewfinder optical system provided independently of said photographing optical system;
    wherein at least one lens which constitutes said viewfinder optical system has respective lengths extending in opposite directions from an optical axis of said at least one lens to a periphery thereof, said respective lengths being different from each other in a horizontal direction.

12. A photographing device according to claim 11, wherein said viewfinder optical system includes a plurality of lenses, said at least one lens being located nearest to an object side of all the plurality of lenses.

13. A photographing device according to claim 11, wherein 0.5<LR<0.8, where LR represents a value obtained by dividing a shorter length extending in one horizontal direction from the optical axis of said at least one lens to the periphery thereof by a longer length extending in an opposite horizontal direction from the optical axis of said at least one lens to the periphery thereof.

14. A photographing device according to claim 11, wherein two or more field-of-view frames having the same field-of-view ratio which indicate different photographing areas relative to different photographing distances are displayed in a field of view of a viewfinder.

15. A photographing device according to claim 14, wherein character information is displayed close to a periphery of each of said field-of-view frames.

16. A photographing device comprising:

a photographing optical system; and a viewfinder optical system provided independently of said photographing optical system;

wherein at least one lens which constitutes said viewfinder optical system has respective lengths extending in opposite horizontal directions from an optical axis of said at least one lens to a periphery thereof, and respective lengths extending in opposite vertical directions from the optical axis of said at least one lens to the periphery thereof, said respective lengths being different from each other in each of the horizontal direction and the vertical direction.

17. A photographing device according to claim 16, wherein said viewfinder optical system includes a plurality of lenses, said at least one lens being located nearest to an object side of all the plurality of lenses.

18. A photographing device according to claim 16, wherein 0.5<LR<0.8, and 0.5<UD<0.8, where LR represents a value obtained by dividing a shorter length extending in one horizontal direction from the optical axis of said at least one lens to the periphery thereof by a longer length extending in an opposite horizontal direction from the optical axis of said at least one lens to the periphery thereof, and UD represents a value obtained by dividing a shorter length extending in one vertical direction from the optical axis of said at least one lens to the periphery thereof by a longer length extending in an opposite vertical direction from the optical axis of said at least one lens to the periphery thereof.

19. A photographing device according to claim 16, wherein two or more field-of-view frames having the same field-of-view ratio which indicate different photographing areas relative to different photographing distances are displayed in a field of view of a viewfinder.

20. A photographing device according to claim 19, wherein character information is displayed close to a periphery of each of said field-of-view frames.

21. An optical apparatus, comprising:

a first optical system; and a second optical system provided independently from the first optical system;

wherein at least one lens constituting the second optical system has a length from an optical axis of the lens to an outer periphery on the first optical system side longer than a length from the optical axis of the lens to an outer periphery on an opposite side.

* * * * *

UNITED STATES PATENT AND TRADEMARK OFFICE
CERTIFICATE OF CORRECTION

PATENT NO. : 5,761,553
DATED : June 2, 1998
INVENTOR(S) : MAKOTO SEKITA

It is certified that error appears in the above-identified patent and that said Letters Patent is hereby corrected as shown below:

ON THE TITLE PAGE:
Item [75] Inventor

"Kanagawa-ken" should read --Yokohama--.

Column 1

Line 29, "a" should read --the--.
Line 30, "an" should read --the--.

Column 7

Line 17, "*d2=19.21" should read --d2=19.21--.

Column 8

Line 38, "where" should read --¶ where--.

Signed and Sealed this

Twenty-third Day of March, 1999

Attest:

Q. TODD DICKINSON

Attesting Officer  Acting Commissioner of Patents and Trademarks